United States Patent
Kondo

(10) Patent No.: US 8,670,677 B2
(45) Date of Patent: Mar. 11, 2014

(54) REMOTE CONTROL SIGNAL RECEIVING CIRCUIT

(75) Inventor: Hideo Kondo, Ora-gun (JP)

(73) Assignees: SANYO Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 194 days.

(21) Appl. No.: 12/837,163

(22) Filed: Jul. 15, 2010

(65) Prior Publication Data

US 2011/0033194 A1    Feb. 10, 2011

(30) Foreign Application Priority Data

Aug. 6, 2009  (JP) .................... 2009-183058

(51) Int. Cl.
*H04B 10/06* (2011.01)
*H04B 10/02* (2011.01)

(52) U.S. Cl.
USPC .......................................... 398/202; 398/106

(58) Field of Classification Search
USPC .................................................. 398/202, 106
See application file for complete search history.

(56) References Cited

U.S. PATENT DOCUMENTS

| | | | | |
|---|---|---|---|---|
| 6,097,520 A * | 8/2000 | Kadnier | ......................... | 398/106 |
| 6,636,026 B1 * | 10/2003 | Nomoto | ........................ | 323/318 |
| 6,747,567 B2 * | 6/2004 | Amano et al. | ............. | 340/12.16 |
| 6,947,296 B2 * | 9/2005 | Hirosawa | ........................ | 363/20 |
| 7,295,785 B2 * | 11/2007 | Takahashi et al. | ............. | 398/202 |
| 7,337,254 B2 * | 2/2008 | Choi et al. | ..................... | 710/266 |
| 7,454,635 B2 * | 11/2008 | Ito et al. | ......................... | 713/322 |
| 7,675,453 B2 * | 3/2010 | Kang et al. | ..................... | 341/176 |
| 7,840,142 B2 * | 11/2010 | Keller | ............................ | 398/202 |
| 8,054,138 B2 * | 11/2011 | Kondo | ............................ | 331/46 |
| 2002/0091961 A1 * | 7/2002 | Inoue | ............................ | 713/601 |
| 2006/0022661 A1 * | 2/2006 | Deppe et al. | .................... | 324/67 |
| 2006/0156047 A1 * | 7/2006 | Ito et al. | ........................ | 713/310 |
| 2007/0041292 A1 * | 2/2007 | Igi | ............................... | 369/47.39 |
| 2009/0244401 A1 * | 10/2009 | Okada et al. | .................. | 348/731 |
| 2011/0080210 A1 * | 4/2011 | Kondo | ........................... | 327/544 |
| 2011/0161686 A1 * | 6/2011 | Kumagaya | .................... | 713/300 |
| 2011/0254722 A1 * | 10/2011 | Naiki | ............................ | 341/173 |
| 2012/0307530 A1 * | 12/2012 | Miyazaki | .................. | 363/21.01 |

FOREIGN PATENT DOCUMENTS

| | | |
|---|---|---|
| JP | 2-250494 | 10/1990 |
| JP | 11-312591 | 11/1999 |
| JP | 2002-238088 | 8/2002 |
| JP | 2003-87195 | 3/2003 |

* cited by examiner

*Primary Examiner* — Ken Vanderpuye
*Assistant Examiner* — Amritbir Sandhu
(74) *Attorney, Agent, or Firm* — Morrison & Foerster LLP

(57) ABSTRACT

The invention is directed to decreasing the power consumption of a remote control signal receiving circuit. A receiving circuit includes a timing signal generation circuit generating a timing signal, a power supply circuit intermittently operating a light receiving element receiving a remote control signal by supplying power to the light receiving element when the timing signal is at a first level and by halting supplying power to the light receiving element when the timing signal is at a second level, a sampling signal generation circuit generating a sampling signal during the operation of the light receiving element corresponding to the timing signal, a sampling circuit sampling an output signal from the light receiving element corresponding to the sampling signal, and a detection circuit detecting the output signal sent from the light receiving element and sampled by the sampling circuit.

6 Claims, 2 Drawing Sheets

REMOTE CONTROL SIGNAL RECEIVING CIRCUIT

CROSS-REFERENCE OF THE INVENTION

This application claims priority from Japanese Patent Application No. 2009-183058, the content of which is incorporated herein by reference in its entirety.

BACKGROUND OF THE INVENTION

1. Field of the Invention

The invention relates to controlling an electronic apparatus such as a television, a home stereo or an air conditioner by a wireless remote control transmitter using infrared rays, radio waves or the like, in particular, relates to a receiving circuit that receives a remote control signal from a remote control transmitter.

2. Description of the Related Art

A remote control signal receiving circuit is provided in an electronic apparatus that is operable by remote control such as a television, a home stereo or an air conditioner. In the remote control signal receiving operation, generally, a remote control signal is received by a light receiving element, the waveform of the received remote control signal is reshaped, and the reshaped remote control signal is decoded and distinguished. A relevant technologies are disclosed in Japanese Patent Application publication No. 2003-87195.

While a conventional remote control signal receiving circuit samples a remote control signal from the light receiving element periodically, the light receiving element operates continuously. Therefore, a problem is the large power consumption of the light receiving element.

SUMMARY OF THE INVENTION

The invention provides a remote control signal receiving circuit receiving an output signal that is outputted from a light receiving element receiving a remote control signal so as to correspond to the remote control signal. The receiving circuit includes a timing signal generation circuit generating a timing signal, a power supply circuit supplying a power to the light receiving element when the timing signal is at a first level and halting the supplying of the power to the light receiving element when the timing signal is at a second level, a sampling signal generation circuit generating a sampling signal when the timing signal is at the first level, a sampling circuit sampling the output signal from the light receiving element in response to the sampling signal, and a detection circuit detecting the output signal from the light receiving element that is sampled by the sampling circuit.

DETAILED DESCRIPTION OF THE INVENTION

Figure 1:
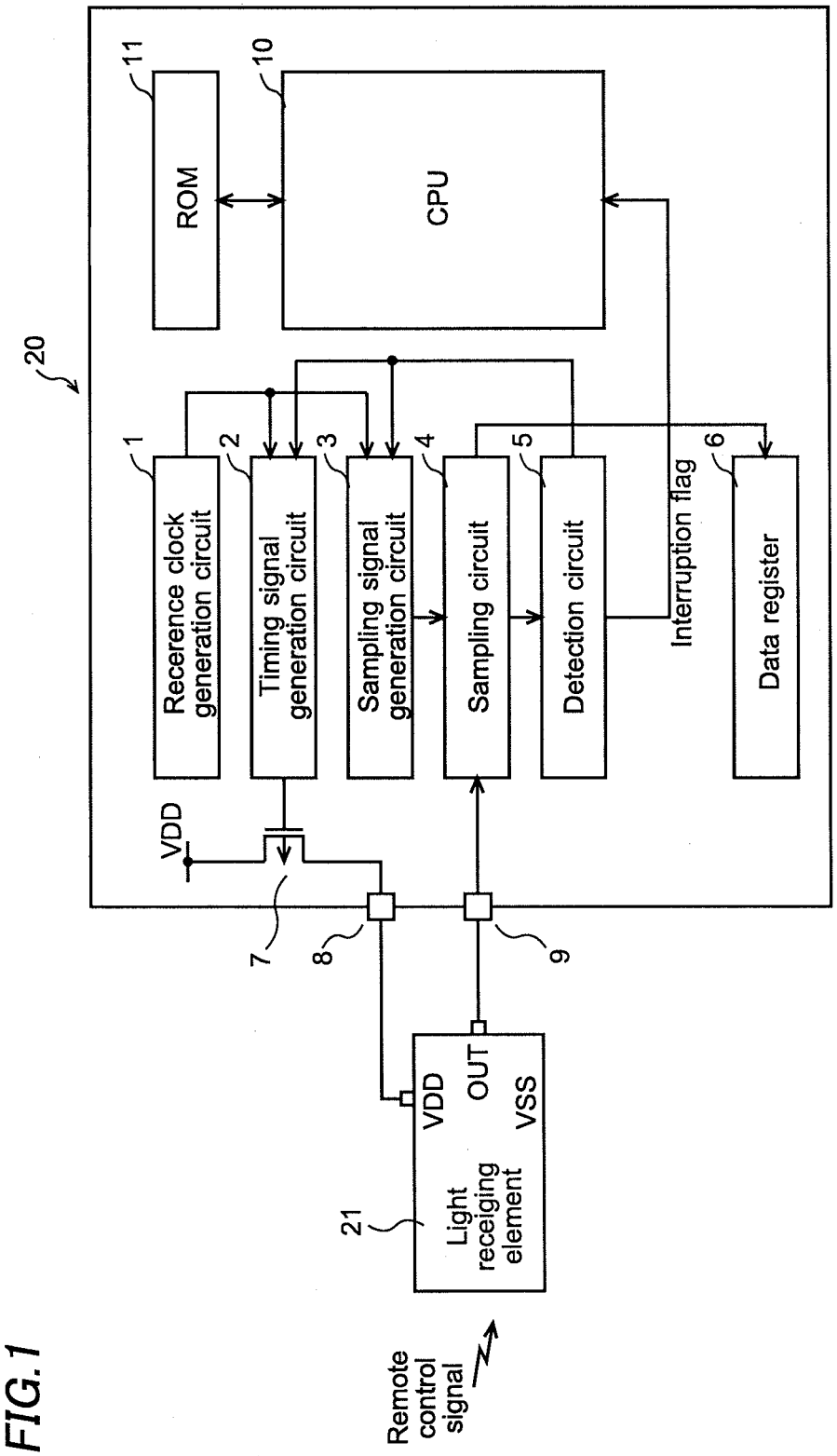
FIG. 1 is a diagram showing a structure of a remote control signal receiving circuit of an embodiment of the invention.

An embodiment of the invention will be described referring to the drawings. FIG. 1 shows a structure of a remote control signal receiving circuit 20 of the embodiment of the invention.

The receiving circuit 20 includes a reference clock generation circuit 1, a timing signal generation circuit 2, a sampling signal generation circuit 3, a sampling circuit 4, a detection circuit 5, a data register 6, a P-channel type MOS transistor 7, a power supply terminal 8, a signal input terminal 9, a CPU 10 and a ROM 11.

This receiving circuit 20 is preferably formed of a one-chip microcomputer, and a light receiving element 21 that receives a remote control signal sent from a remote control transmitter and reshapes the waveform of the received remote control signal is provided outside the receiving circuit 20. In this case, a remote control signal sent from a remote control transmitter includes a burst signal having a given carrier frequency.

The light receiving element 21 receives a burst signal and reshapes the waveform of the signal (processing including filtering). The light receiving element 21 then outputs the reshaped remote control signal as an output signal from the output terminal OUT. When the remote control signal is an infrared ray signal, the light receiving element 21 is an infrared ray light receiving element. When the remote control signal is of radio waves, the light receiving element 21 is a radio wave receiving element.

The reference clock generation circuit 1 is a circuit that generates a reference clock for the whole system of the receiving circuit 20 including the CPU 10 etc, and is formed of a crystal oscillator circuit that generates a reference clock having a frequency of 32 KHz (about 32 μ second period), for example.

The timing signal generation circuit 2 generates a timing signal based on the reference clock generated by the reference clock generation circuit 1. The timing signal generation circuit 2 has a frequency divider, and is configured so as to generate the timing signal having a longer period than the reference clock by dividing the frequency of the reference clock by the frequency divider.

This timing signal is applied to the gate of the P-channel type MOS transistor 7. The power supply potential VDD (e.g. +5V) of the receiving circuit 20 is applied to the source of the P-channel type MOS transistor 7, and the drain thereof is connected to the power supply terminal 8. The power supply terminal 8 is connected to the power supply terminal of the light receiving element 21.

With this structure, when the timing signal is at the low level, the P-channel type MOS transistor 7 is in the ON state, power is supplied to the light receiving element 21 through the P-channel type MOS transistor 7, and the light receiving element 21 is in the operation state. On the other hand, when the timing signal is at the high level, the P-channel type MOS transistor 7 is in the OFF state, power supply to the light receiving element 21 is halted, and the light receiving element 21 halts operating. In other words, when the timing signal alternates between the low level and the high level, the light receiving element 21 intermittently operates corresponding to the timing signal.

The sampling signal generation circuit 3 generates a sampling signal based on the reference clock generated by the reference clock generation circuit 1. In this case, the sampling signal is generated during the operation of the light receiving element 21, i.e., during the low level period of the timing signal.

The sampling circuit 4 samples an output signal outputted from the output terminal OUT of the light receiving element 21 corresponding to the sampling signal. In this case, an output signal from the light receiving element 21 is inputted to the sampling circuit 4 through the signal input terminal 9 of the receiving circuit 20.

The detection circuit 5 detects an output signal of the light receiving element 21 that is sampled by the sampling circuit 4. In detail, an output signal (a remote control signal of which the waveform is reshaped) of the light receiving element 21 generally includes signals corresponding to a guide pulse sent first from the remote control transmitter (a kind of start pulse) and a data pulse train having a given number of bits (e.g. 8 bits) sent subsequent to this guide pulse. For example, the output signal of the light receiving element 21 includes the low level signals corresponding to the guide pulse and the data pulse train.

In this case, when the detection circuit 5 detects a guide pulse through the light receiving element 21, the timing signal generation circuit 2 fixes the timing signal at the low level by the detection of this guide pulse. By this, the P-channel type MOS transistor 7 is in the ON state continuously, so that power is supplied to the light receiving element 21 through the P-channel type MOS transistor 7 and the light receiving element 21 operates continuously.

In detail, when the detection circuit 5 detects a change of the remote control signal (detects the guide pulse) first, the timing signal generation circuit 2 fixes the timing signal at the low level. By this, the light receiving element 21 operates continuously.

Furthermore, when the detection circuit 5 detects the data pulse train through the light receiving element 21, the detection circuit 5 generates an interruption flag, and the CPU 10 is started in response to this interruption flag and executes a program stored in the ROM 11 to decode the data pulse train. In this case, the data pulse train is transmitted from the sampling circuit 4 to the data register 6 and held therein. The CPU 10 decodes the data pulse train held in the data register 6.

During the intermittent operation of the light receiving element 21, the sampling signal generation circuit 3 generates the sampling signal having a first period that is synchronized with the timing signal. During the continuous operation of the light receiving element 21, the sampling signal generation circuit 3 generates the sampling signal having a shorter period than during the intermittent operation. Therefore, the detection circuit 5 certainly detects the data pulse train.

Figure 2:
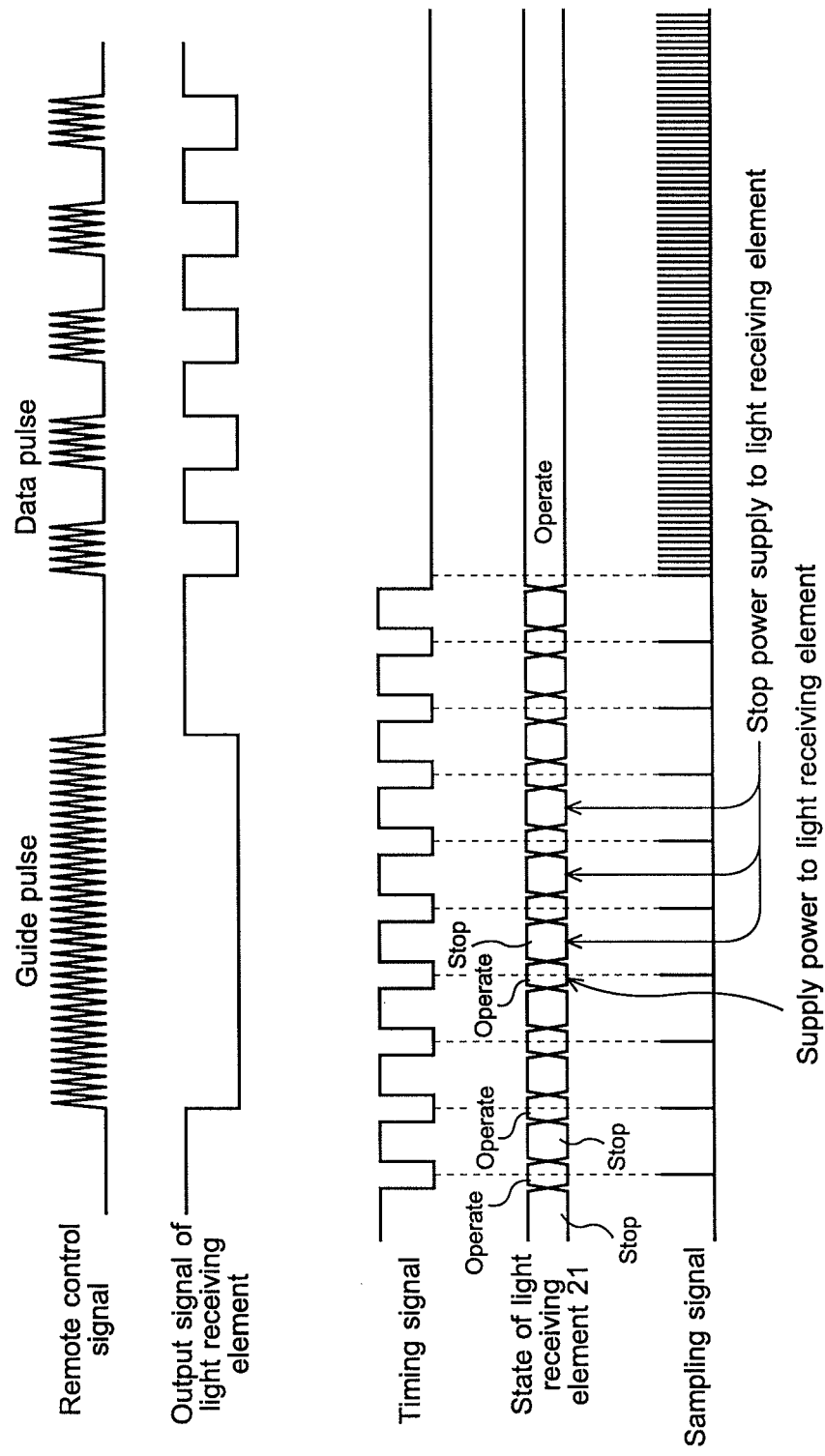
FIG. 2 is a diagram showing an operation of the remote control signal receiving circuit of the embodiment of the invention.

Next, an operation of the receiving circuit 20 of the embodiment will be described referring to FIG. 2. First, in a waiting state for a remote control signal, the timing signal alternates between the low level and the high level. The period is about 500μ seconds, for example, that is longer than the period of the reference clock (about 32μ seconds). The sampling signal is synchronized with the timing signal, and in that case the period of the sampling signal is equal to that of the timing signal. The sampling signal is generated during the period where the timing signal is at the low level and the light receiving element 21 is operating.

In other words, when the sampling signal (at the high level) is generated and the sampling circuit 4 performs a sampling operation, the light receiving element 21 is operated. In this manner, by the intermittent operation of the light receiving element 21, the power consumption of the light receiving element 21 is decreased.

The sampling signal is generated during the period where the timing signal is at the low level and the light receiving element 21 is operating. In order to obtain a stable sampling operation, it is preferable to generate the sampling signal at the end of the period of the operation of the light receiving element 21.

When the detection circuit 5 detects the guide pulse of a remote control signal, the timing signal generation circuit 2 fixes the timing signal at the low level by the detection of the guide pulse. By this, the P-channel type MOS transistor 7 is in the ON state continuously, and the light receiving element 21 operates continuously. Furthermore, during the continuous operation of the light receiving element 21 by the detection of the detection circuit 5, the sampling signal generation circuit 3 generates the sampling signal having a shorter period (e.g. 32μ seconds equal to the reference clock) than during the intermittent operation.

When the detection circuit 5 detects the data pulse train of the remote control signal, the detection circuit 5 generates an interruption flag, and the CPU 10 is started in response to this interruption flag and executes a program stored in the ROM 11 to decode the data pulse train. Then the CPU 10 executes a program stored in the ROM 11 corresponding to the decoding result to control the electronic apparatus. Accordingly, the power consumption is reduced.

What is claimed is:

1. A remote control signal receiving circuit receiving an output signal that is outputted from a light receiving element receiving a remote control signal so as to correspond to the remote control signal, the receiving circuit comprising:
   a reference clock generation circuit generating a reference clock signal;
   a timing signal generation circuit generating a timing signal that alternates between a first level and a second level, the timing signal having a lower frequency than the reference clock signal, and the first level being different from the second level;
   a power supply circuit supplying a power to the light receiving element when the timing signal is at the first level and halting the supplying of the power to the light receiving element when the timing signal is at the second level, wherein the light receiving element intermittently operates corresponding to the timing signal and the power supply circuit is contained in a housing of the remote control signal receiving circuit;
   a sampling signal generation circuit generating a sampling signal when the timing signal is at the first level;
   a sampling circuit sampling the output signal from the light receiving element in response to the sampling signal; and
   a detection circuit detecting the output signal from the light receiving element that is sampled by the sampling circuit.

2. The remote control signal receiving circuit of claim 1, wherein the timing signal generation circuit is configured to maintain the timing signal at the first level when the detection circuit detects a first change in the output signal.

3. The remote control signal receiving circuit of claim 1, wherein the remote control signal comprises a guide pulse sent first by a remote control transmitter and a data pulse train sent subsequent to the guide pulse, and the timing signal generation circuit is configured to maintain the timing signal at the first level when the detection circuit detects the guide pulse through the output signal of the light receiving element.

4. The remote control signal receiving circuit of claim 3, further comprising a ROM storing a program and a CPU executing the program stored in the ROM, wherein the detection circuit is configured to generate an interruption flag when the detection circuit detects the data pulse train through the output signal of the light receiving element, and the CPU is configured to be activated in response to the interruption flag and execute the program stored in the ROM to decode the data pulse train.

5. The remote control signal receiving circuit of claim 1, wherein the power supply circuit comprises a transistor to which a voltage is supplied and a power supply terminal connected to the transistor, and the transistor is configured to turn on and supply the power to the light receiving element through the transistor and the power supply terminal when the timing signal is at the first level.

6. The remote control signal receiving circuit of claim 1, wherein the sampling signal generation circuit generates a sampling signal with a shorter period when the detection circuit detects a first change in the output signal.

* * * * *